July 9, 1946.  A. M. STANLEY  2,403,690
VEHICLE WHEEL
Filed Sept. 26, 1944
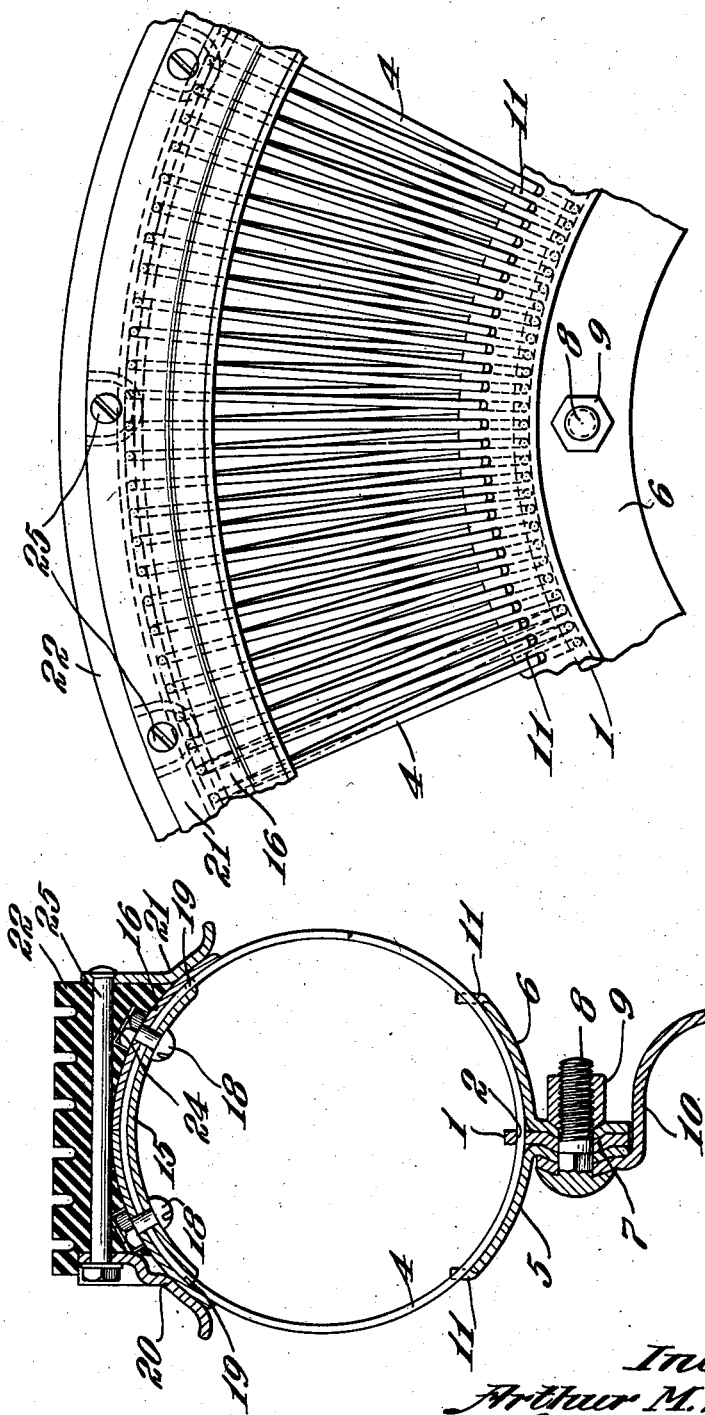
Inventor
Arthur M. Stanley
by Roberts, Cushman & Grover
Att'ys.

Patented July 9, 1946

2,403,690

UNITED STATES PATENT OFFICE 2,403,690

VEHICLE WHEEL

Arthur M. Stanley, Lynn, Mass., assignor to Stanley Engineering, Inc., Boston, Mass., a corporation of Massachusetts Application September 26, 1944, Serial No. 555,773

5 Claims. (Cl. 152—92)

This invention relates to an improved tire for a vehicle wheel and its principal object is to provide a tire which possesses the advantageous features of the conventional pneumatic tire, but which is not subject to such well-known disadvantages as punctures, blowouts, carcass injury, etc.

Further objects relate to various features of construction and will be apparent from a consideration of the following description.

According to the present invention the tire comprises an annular plate having circumferentially spaced perforations through which a single helical spring is threaded so as to provide a resilient toroid extending about the plate. A pair of divided half rims, i. e., an inner half and an outer half, is suitably secured to the annular plate so as to embrace the inner periphery of the helical spring, each half rim preferably being formed with lugs, corrugations or the like adapted to project between the convolutions of the spring so as to maintain them in properly spaced relation. Suitable connections are provided by means of which the annular plate and divided rims may be conveniently attached to the hub or body portion of a vehicle wheel.

The outer peripheral portion of the spring carries inner and outer circumferential rings suitably secured together on opposite sides of the spring and one or both of these rings are provided with lugs or corrugations projecting between the convolutions of the spring so as to cooperate with similar elements on the divided rims in maintaining the convolutions properly spaced. Inner and outer tread-retaining plates or flanges are welded or otherwise secured to the outer ring so as to define a circumferential recess for the reception of a suitable tread member which may be of natural or synthetic rubber, leather, a metal face for snow and ice, a flange metal tread for railroad use, or any other suitable material.

In the accompanying drawing which shows what is now considered a preferred embodiment:

Fig. 1 is a radial section at right angles to the axis through my tire; and

Fig. 2 is a fragmentary side elevation of the tire.

The numeral 1 designates an annular plate provided with circumferentially spaced openings 2 through which a stout helical tension-compression spring 4 is threaded, the ends of the spring adjoining and being welded together. The inner and outer halves 5 and 6 of a divided rim are positioned against the inner and outer faces, respectively, of the annular plate 1, the inwardly projecting flanges of the rims and body of the plate being dished and pierced at circumferentially spaced points, as indicated at 7, to receive bolts 8 and nuts 9 which rigidly secure the parts to an attaching flange or disk 10 of a wheel or hub such, for example, as is shown in United States Patent No. 2,096,366, granted October 19, 1937. Both rims 5 and 6 are formed at or adjacent to their extremities with lugs 11 which project between the convolutions of the spring to hold them in properly spaced position.

The outer peripheral portion of the spring 4 carries an inner circumferential split ring 15 and an outer circumferential divided ring 16 which are of concavo-convex cross-section to conform with the curvature of the spring convolutions and secured together with the spring convolutions therebetween by bolts 18, the adjoining ends of the ring 15 and also the contiguous circumferential edges of the outer ring 16 being welded. The circumferential marginal portions of the ring 15 are formed with lugs 19 which project between the convolutions of the spring 4 and cooperate with the lugs 11 to maintain the convolutions in properly spaced position. This construction prevents excessive collapsing or deformation of the spring when the tire is subjected to severe impacts, due to the distribution of strains throughout the periphery of the spring. A pair of spaced annular tread-retaining flanges or plates 20 and 21 are welded to the marginal portions of the outer ring 16 and between these flanges a tread member 22 is received. As here shown by way of example the tread member is of solid rubber or rubber-like material and is preferably made in four sections, each being formed at its under side with recessed portions 24 to receive the ends of the bolts 18 and nut applied thereto, and the body portion of the tread is drilled transversely to receive bolts 25 which extend from one flange to the other and serve firmly to anchor the tread in position.

The parts are assembled as follows: The helical spring 4 is first threaded through the openings 2 in the annular plate 1 and its ends are welded together. The inner circumferential split ring 15 is next inserted between convolutions of the spring 4, after which its ends are arc-welded together. The inner half of the ring 16 is spot-welded to the inner flange 20 and the outer half is spot-welded to the outer flange 21 and these parts are then applied to the outer periphery of the spring and secured by the bolts 18 to the inner ring 15, it being understood that the shanks of bolts 18 pass between convolutions of the spring.

The tread members 22 are then applied between the retaining flanges and finally the attaching bolts 25 are inserted through the transverse openings of the treads. If desired a suitable covering of fabric or the like flexible material may be applied about the side walls of the spring so as to prevent foreign matter from working in between the convolutions.

A vehicle wheel embodying the construction herein shown is capable of withstanding the shocks incident to severe use since the spring 4 is sufficiently resilient to yield under impact without undergoing permanent deformation and the rings 15, 16 and associated parts are effective to transmit tension forces so that there is a relatively uniform distribution of strain throughout the entire periphery. Moreover, the attaching bolts 25 not only permit a quick and convenient replacement of the tread elements, but also prevents "creeping" of the tread relative to the tread mounting. It will be noted that in a wheel constructed in accordance with the present invention the outer half rim may be readily removed so as to permit the tire, tread and annular ring to be quickly demounted without removing the wheel and the replacement of another annular ring and tire.

While I have shown and described one desirable embodiment of the invention it is to be understood that this disclosure is for the purpose of illustration and that various changes and modifications may be made without departing from the spirit and scope of the invention as set forth in the appended claims.

I claim:

1. A vehicle wheel comprising an annular plate having circumferentially spaced openings, a helical spring threaded through said openings with its ends secured together to provide a toroid extending about said plate, rim members secured to the opposite faces of said plate and embracing the inner peripheral portion of said spring, attaching means for securing said plate to a vehicle wheel, inner and outer circumferential rings disposed on opposite sides of the outer peripheral portion of said spring and rigidly secured together so as to clamp the outer peripheral portion of said spring therebetween, and a tread member mounted on the outer ring.

2. A vehicle wheel comprising an annular plate having circumferentially spaced openings, a helical spring threaded through said openings with its ends secured together to provide a toroid extending about said plate, rim members secured to the opposite faces of said plate and embracing the inner peripheral portion of said spring, attaching means for securing said plate to a vehicle wheel, inner and outer circumferential rings on opposite sides of the outer peripheral portion of said spring and rigidly secured together so as to clamp the outer peripheral portion of said spring therebetween, inner and outer tread-retaining flanges secured to the outer ring, and a tread member secured to said retaining flanges.

3. A vehicle wheel comprising an annular plate having circumferentially spaced openings, a helical spring threaded through said openings with its ends secured together to provide a toroid extending about said plate, rim members secured to the opposite faces of said plate and embracing the inner peripheral portion of said spring, attaching means for securing said plate to a vehicle wheel, inner and outer circumferential rings of concavo-convex cross-section disposed on opposite sides of the outer peripheral portion of said spring and rigidly secured together so as to clamp the outer peripheral portion of said spring therebetween, said rim members and one of said circumferential rings having parts projecting between the convolutions of said spring to hold them in properly spaced position, and a tread member mounted on the outer ring.

4. A vehicle wheel comprising an annular plate having circumferentially spaced openings, a helical spring threaded through said openings with its ends secured together to provide a toroid extending about said plate, rim members secured to the opposite faces of said plate and embracing the inner peripheral portion of said spring, attaching means for securing said plate to a vehicle wheel, inner and outer circumferential rings of concavo-convex cross-section disposed on opposite sides of the outer peripheral portion of said spring and rigidly secured together so as to clamp the outer peripheral portion of said spring therebetween, said rim members and one of said circumferential rings having parts projecting between the convolutions of said spring to hold them in properly spaced position, inner and outer tread-retaining flanges secured to said outer ring, and a tread member secured to said retaining flanges.

5. A vehicle wheel comprising an annular plate having circumferentially spaced openings, a helical spring threaded through said openings with its ends secured together to provide a toroid extending about said plate, rim members secured to the opposite faces of said plate and embracing the inner peripheral portion of said spring, attaching means for securing said plate to a vehicle wheel, inner and outer circumferential rings of concavo-convex cross-section disposed on opposite sides of the outer peripheral portion of said spring and rigidly secured together so as to clamp the outer peripheral portion of said spring therebetween, inner and outer tread-retaining flanges secured to the outer ring, a tread member fitting between the inner walls of said flanges, and attaching elements extending through said flanges and tread member for securing the tread member in position.

ARTHUR M. STANLEY.